Jan. 21, 1964 C. ROCHER 3,118,607
SPRAYING MACHINE
Filed July 9, 1962

INVENTOR
CALVIN ROCHER
ATTORNEY

United States Patent Office
3,118,607
Patented Jan. 21, 1964

3,118,607
SPRAYING MACHINE
Calvin Rocher, Listowel, Ontario, Canada
Filed July 9, 1962, Ser. No. 208,385
2 Claims. (Cl. 239—104)

This invention relates to improvements in a spraying machine and appertains particularly to a front end power sprayer suitable for applying sprays such as weed killing chemicals to a lawn.

In some kinds of spraying it is required that the spray be applied uniformly over the given area and sometimes it is critically important that the spray be strictly confined to the area being treated, as in the case of spraying adjacent to trees, shrubs and flower beds when a weed killer spray being used on the lawn can cause serious damage to nearby vegetation.

It is an object of the present invention to provide a power-driven sprayer wherein the spray nozzle is hooded to assure that the spray is strictly confined to the area over which the machine passes.

A further object of the invention is to provide a sprayer with a compound nozzle whose multiple outlets are so arranged that a relatively wide swath is covered by a plurality of complementary jets of spray that meet at adjoining edges with only a modicum of overlap so that a uniform application of spray is delivered across the entire width of the swath.

A further object of the invention is to provide a front end power spray designed to treat a wide swath with a carefully directed spray from a multiple jet nozzle wherein the uniformity of the application of the spray is initially determined by the nozzle arrangement and additionally by a transversely elongated hood, coinciding substantially with the overall outline of the spray, that effectively shields the spray flow from the multiple jets to contact with the surface being treated so that damage to even immediately adjacent areas is precluded, thus allowing of full spraying right up to the edge of trees, shrubs, flower beds and the like.

A still further object of the invention is the provision of a front end power spray machine of the nature and for the purpose described that is characterized by structural simplicity, durability and a relatively reasonable cost of production, that will function efficiently and safely and that is simple to service and easy to operate, whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Figure 1:
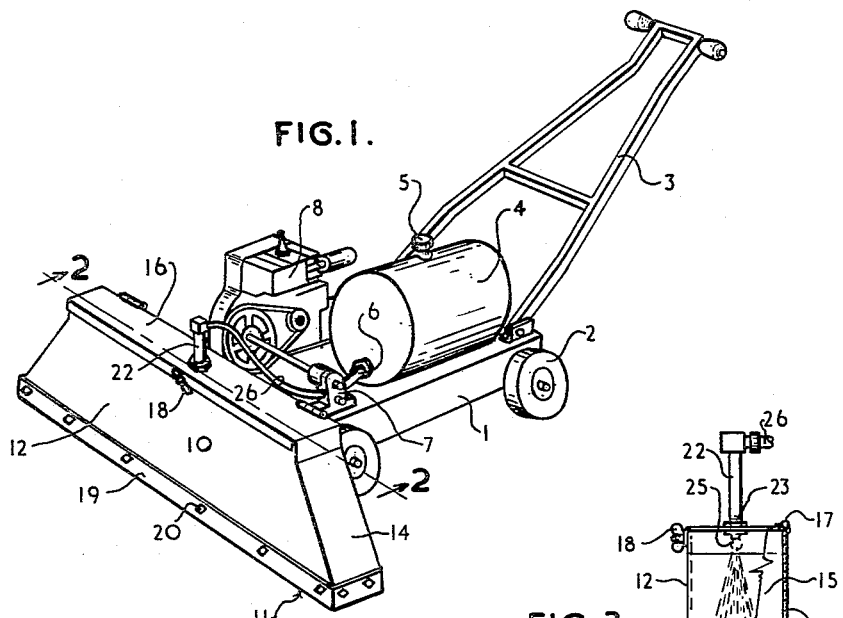
FIGURE 1 is a perspective view of a sprayer embodying a possible form of the invention.
Figure 3:
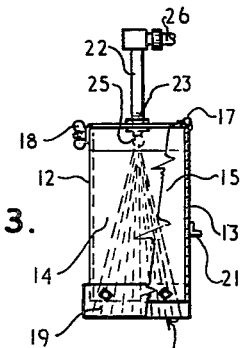
FIGURE 3 is an end elevation of the hood, with part of the near end broken away.
Figure 2:
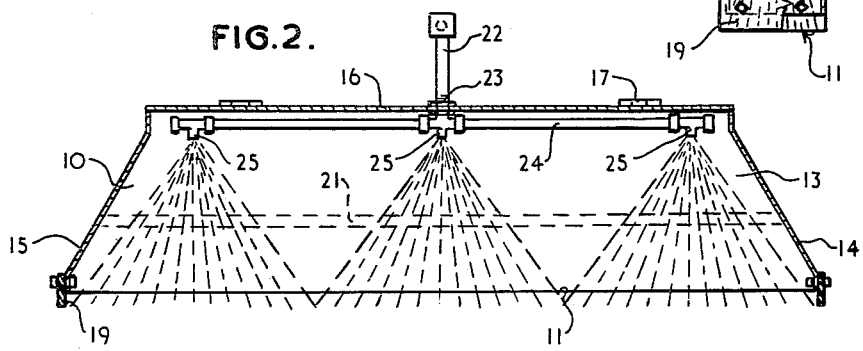
FIGURE 2 is a vertical transverse section of the spray hood as taken on line 2—2 of FIGURE 1.
Figure 4:
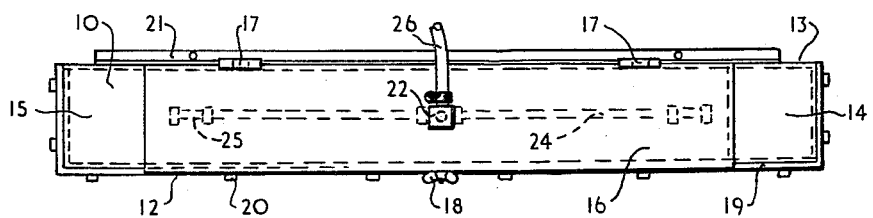
FIGURE 4 is a plan view of the hood.

The spray machine, shown in FIGURE 1, includes a frame 1 mounted on wheels 2 and provided with a push handle 3. On the wheel carried frame, a large tank 4 for the spray liquid is supported which in turn is provided with a filling opening normally closed by a removable cap 5.

A supply line 6 runs from the tank 4 to a pressure pump 7 that is powered by a motor 8 both mounted on the wheeled frame 1.

Disposed across the front end of the wheeled frame 1 is a downwardly facing spray hood 10, rectangular in horizontal cross-section, and having an open bottom 11. The hood has parallel front and back walls 12 and 13, end walls 14 and 15 that incline outwardly for the greater part of their height but are preferably vertical at both top and bottom and a top 16, in the form of a cover that is connected to the upper edge of the back wall 13 by hinges 17 and secured to the upper part of the front wall 12 by a fastener 18.

Around the front and ends of the open bottom 11 a depending skirt 19 is removably secured to the front and end walls 12 and 14 and 15 respectively by fasteners 20. This allows a longer or shorter skirt to be employed if desired.

A simple way of mounting the hood 10 on the front end of the frame 1 is by means of a horizontal angle member 21 that is secured on the rear wall 13 of the hood connected to a similar angle member secured to the front of the said frame. The hood 10 it will be noted is elongated transversely in the direction of travel of the spray machine, being narrow in width but with a length to extend substantially beyond the sides of the wheel carried frame.

The spray nozzle 22 includes a pipe passing vertically through the hood cover 16, secured thereto in vertically adjustable relation by companion nuts 23 threaded thereon and engaging upper and lower sides of said cover feeding a horizontal line 24 on the underside of the cover that is provided with a plurality of downwardly directed jet openings or T-jet nozzles 25 spaced longitudinally of the hood. A flexible conduit 26 connects the power pump 7 with the vertical nozzle pipe 22 to supply liquid from the tank 4 to the nozzle's jet 25 under pressure.

The plurality of spaced downwardly directed jet openings 25 that comprise the spray nozzle on the underside of the hood's hinged cover are so arranged and spaced in a line transversely of the direction of travel of the machine that the spread of the streams of spray material from the several jets is approximately complementary at the open bottom of the hood with the width of the streams being about the width of the open bottom of the hood and the aggregate length of the complementary streams being about the length of the transversely elongated hood whereby the area being spray treated and lying immediately under the hood receives an evenly distributed application, the outer sides of the streams of the end spray jets substantially paralleling the incline of the adjacent end walls of the hood.

In use, this hand propelled power sprayer which is especially suitable for treating lawns with weed killer liquid sprays, is pushed and pulled across the entire lawn surface, evenly applying the spray to wide strips substantially corresponding in width to the major or longitudinal, dimension of the hood that extends transversely to the line of travel of the machine. The elevation at which the hood is disposed is preferably such that the lower edge of the hood defining the open bottom thereof just clears the grass thereby confining the spray to the underlying area of the lawn, however to preclude any possibility of spray being splashed or carried by wind to vegetation such as shrubs, trees, or flower beds ahead or to either side of the hood, and to allow the machine to operate safely right up to the edge of such vegetation, the depending skirt of rubber-like or plastic material runs across the front and back on both ends of the open bottom of the hood, the skirt being of a suitable length to engage the grass and thus assuring that nothing but the turf immediately under the hood receives any of the chemical spray.

Since inspection of the T-jet nozzles 25 may not only be advisable but necessary, I have provided hinges 17 for the cover 16 which may be swung open upwardly to expose and extract the nozzles 25 from the confines of the hood. Further, this hinged cover 16 provides for the adjustment of the height of the nozzles 25 under the hood by permitting ready adjustment of the companion nuts 23 threaded on the pipe 22, without having to remove the spraying device from the cover. It will also be observed that the flexible conduit 26 permits of the cover 16 being readily swung backwardly into open position without impediment or hindrance.

From the foregoing description taken in connection with the accompanying drawings, it will be manifest that a spraying machine is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A spraying machine comprising a wheel carried frame, a horizontal angle member secured on the front thereof, a spray hood having a horizontal angle member on its rear wall coacting with the said first angle member detachably securing the spray hood to the frame, the said spray hood being elongated transversely of the direction of travel of the machine and having an open bottom and an open upper end, a hinged cover for the open upper end of said spray hood, a spray nozzle extending through said hinged cover and adjustable vertically with respect thereto, the lower end of said nozzle projecting into the interior of the hood, a horizontally disposed line connected to the lower end of said spray nozzle and arranged transversely to the direction of travel of the machine, a plurality of jets in the horizontally disposed line so spaced that the spread of the streams of spray from the several jets are approximately complementary at the bottom of the hood and means for supplying liquid spray under pressure to the spray nozzle comprising a tank on the wheel carried frame and a flexible conduit connecting said tank and said spray nozzle.

2. A spraying machine comprising a wheel carried frame, a horizontal angle member secured on the front thereof, a spray hood having a horizontal angle member on its rear wall co-acting with the said first angle member detachably securing the spray hood to the frame, the said spray hood being elongated transversely of the direction of travel of the machine and having an open bottom and an open upper end, a hinged cover for the open upper end of said spray hood, a spray nozzle extending through said hinged cover and adjustable vertically with respect thereto, companion nuts threaded on said nozzle and engaging the upper and lower sides of said cover, the lower end of said nozzle projecting into the interior of the hood, a horizontally disposed line connected to the lower end of said spray nozzle and arranged transversely to the direction of travel of the machine, a plurality of jets in the horizontally disposed line so spaced that the spread of the streams of spray from the several jets are approximately complementary at the bottom of the hood and means for supplying liquid spray under pressure to the spray nozzle comprising a tank on the wheel carried frame and a flexible conduit connecting said tank and said spray nozzle whereby the hinged cover of the hood carrying the spray nozzle may be swung open for adjusting the nozzle or servicing the jets without disconnecting the nozzle and tank.

References Cited in the file of this patent

UNITED STATES PATENTS

| | | |
|---|---|---|
| 1,462,861 | Jordan | July 24, 1923 |
| 2,086,055 | Taylor | July 6, 1937 |
| 2,367,594 | Madison | Jan. 16, 1945 |
| 2,581,678 | Malin et al. | Jan. 8, 1952 |
| 2,589,020 | North | Mar. 11, 1952 |
| 2,740,664 | Yates | Apr. 3, 1956 |